(12) United States Patent
Cheng (10) Patent No.: US 11,664,668 B2
(45) Date of Patent: May 30, 2023

(54) CHARGING ASSEMBLY AND ELECTRONIC DEVICE SYSTEM

(71) Applicant: BOE TECHNOLOGY GROUP CO., LTD, Beijing (CN)

(72) Inventor: Xinyi Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 263 days.

(21) Appl. No.: 16/770,447

(22) PCT Filed: Nov. 19, 2019

(86) PCT No.: PCT/CN2019/119398
§ 371 (c)(1),
(2) Date: Jun. 5, 2020

(87) PCT Pub. No.: WO2020/103816
PCT Pub. Date: May 28, 2020

(65) Prior Publication Data
US 2021/0167614 A1 Jun. 3, 2021

(30) Foreign Application Priority Data

Nov. 20, 2018 (CN) .......................... 201821918728.2

(51) Int. Cl.
*H02J 7/00* (2006.01)
*F16H 21/04* (2006.01)
*F16H 21/44* (2006.01)
*F16M 11/24* (2006.01)

(52) U.S. Cl.
CPC ............ *H02J 7/0042* (2013.01); *F16H 21/04* (2013.01); *F16H 21/44* (2013.01); *F16M 11/24* (2013.01); *H02J 7/0044* (2013.01); *F16M 2200/061* (2013.01)

(58) Field of Classification Search
CPC ........ H02J 7/0042; H02J 7/0044; F16H 21/04
USPC ......................................................... 320/115
See application file for complete search history.

(56) References Cited

U.S. PATENT DOCUMENTS

| 2010/0201309 A1* | 8/2010 | Meek ...................... B60L 53/34 |
| | | 701/1 |
| 2016/0276856 A1 | 9/2016 | Miller et al. |
| 2020/0324661 A1* | 10/2020 | Freeling-Wilkinson ..................... |
| | | B60L 53/30 |

FOREIGN PATENT DOCUMENTS

| CN | 202448897 U | 9/2012 |
| CN | 203151188 U | 8/2013 |
| CN | 106476648 A | 3/2017 |
| CN | 106740184 A | 5/2017 |

(Continued)

Primary Examiner — Suchin Parihar
(74) Attorney, Agent, or Firm — Nath, Goldberg & Meyer; Joshua B. Goldberg (57) ABSTRACT

The present disclosure provides a charging assembly for charging an electronic device and an electronic device system including the charging assembly. The charging assembly includes a charging transmission line, a fixing member and a telescopic member. A first end of the telescopic member is fixedly arranged on the fixing member, an input part of the charging transmission line is fixed at a second end of the telescopic member, and the telescopic member is retractable and extendable so that the input part is moved toward or away from the fixing member to be disconnected or connected to a power source.

8 Claims, 8 Drawing Sheets (56) References Cited

FOREIGN PATENT DOCUMENTS

| CN | 108116261 A | 6/2018 |
| CN | 208862619 U | 5/2019 |

* cited by examiner

CHARGING ASSEMBLY AND ELECTRONIC DEVICE SYSTEM

CROSS-REFERENCE TO RELATED APPLICATION

This is a National Phase Application filed under 35 U.S.C. 371 as a national stage of PCT/CN2019/119398, filed Nov. 19, 2019, an application claiming the benefit of Chinese Application No. 201821918728.2, filed Nov. 20, 2018, the content of each of which is hereby incorporated by reference in its entirety.

TECHNICAL FIELD

The present disclosure relates to the field of electronic devices, and particularly relates to a charging assembly for charging an electronic device and an electronic device system including the charging assembly.

BACKGROUND

With the rapid development of the electronic device industry, there are increasing requirements on the duration time, the charging speed and the charging convenience of power sources of electronic devices. In view of this, researchers in the electronic device industry have created various rapid and convenient charging methods and devices, such as the rapid charging technology and the wireless charging technology.

SUMMARY

In an aspect of the present disclosure, there is provided a charging assembly for charging an electronic device, wherein the charging assembly includes: a charging transmission line including a lead wire part, an output part configured to be coupled to the electronic device to be charged, and an input part configured to be coupled to a power supply device, the input part and the output part being coupled to two ends of the lead wire part, respectively; a fixing member; and a telescopic member, wherein a first end of the telescopic member is fixedly arranged on the fixing member, the output part is fixed at the first end of the telescopic member, a second end of the telescopic member is fixed at the input part, and the lead wire part is deformable with extension and retraction of the telescopic member.

Optionally, the telescopic member includes a plurality of movable units connected in sequence, each of which includes a first movable rod and a second movable rod intersected with each other and hinged at an intersection point; and in two adjacent movable units, a first end of the first movable rod of one movable unit is hinged to a second end of the second movable rod of the other movable unit, and a first end of the second movable rod of one movable unit is hinged to a second end of the first movable rod of the other movable unit so that when the second end of the first movable rod of one of the plurality of movable units is moved toward or away from the second end of the second movable rod of the movable unit, the second ends of the first movable rods of the rest movable units are synchronously movable toward or away from the second ends of the second movable rods of the rest movable units, and so that the telescopic member is correspondingly extended or retracted.

Optionally, a sliding groove is provided on a surface of the fixing member, the second end of the first movable rod of the movable unit located at the first end of the telescopic member is hinged to the fixing member, and the second end of the second movable rod of the movable unit located at the first end of the telescopic member is disposed and slidable in the sliding groove, so as to move toward or away from the second end of the first movable rod.

Optionally, the charging assembly further includes a connection unit, and the movable unit located at the first end of the telescopic member is hinged to the fixing member at a hinge point of the first movable rod and the second movable rod of the movable unit; and the connection unit is hinged to the movable unit located at the first end of the telescopic member.

Optionally, the connection unit includes a first connection rod, a second connection rod and a third connection rod, a first end of the first connection rod, a first end of the second connection rod and a first end of the third connection rod are all hinged together, a second end of the first connection rod is hinged to the second end of the second movable rod of the movable unit located at the first end of the telescopic member, and a second end of the second connection rod is hinged to the second end of the first movable rod of the movable unit located at the first end of the telescopic member.

Optionally, the charging assembly further includes a rotation rod and a motor, a first end of the rotation rod is fixedly connected to an output shaft of the motor, and a second end of the rotation rod is hinged to a second end of the third connection rod.

Optionally, each of the movable units has a lead wire through hole provided in the first movable rod or the second movable rod of a single movable unit, an axial direction of the lead wire through hole is consistent with a length direction of the first movable rod when the lead wire through hole is provided in the first movable rod, and an axial direction of the lead wire through hole is consistent with a length direction of the second movable rod when the lead wire through hole is provided in the second movable rod; and the lead wire part of the charging transmission line sequentially passes through the lead wire through holes in the movable units.

Optionally, the input part includes a first input connection rod, a second input connection rod, an input fixing member and a plurality of elastic conductive members, a first end of the first input connection rod is hinged to the first end of the first movable rod of the movable unit located at the second end of the telescopic member, a second end of the first input connection rod is hinged to the input fixing member, a first end of the second input connection rod is hinged to the first end of the second movable rod of the movable unit located at the second end of the telescopic member, a second end of the second input connection rod is hinged to the input fixing member, and, a second end of the first input connection rod is hinged to the second end of the second input connection rod; and the elastic conductive members are arranged on the input fixing member and coupled to the lead wire part, and are further configured to match the power supply device.

In another aspect of the present disclosure, there is further provided an electronic device system, including an electronic device and a charging assembly, wherein the charging assembly is a charging assembly as described above, the fixing member is fixedly connected to the electronic device, and a charging end of the electronic device is coupled to the output part of the charging transmission line.

Optionally, the electronic device includes an electronic picture frame.

BRIEF DESCRIPTION OF THE DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure, in which.

DETAILED DESCRIPTION OF THE EMBODIMENTS

Hereinafter, specific embodiments of the present disclosure will be described with respect to the accompanying drawings. It will be appreciated that the specific embodiments as set forth herein are merely for the purpose of illustration and explanation of the disclosure and should not be constructed as a limitation thereof.

In the related art, a charging device is typically used by connecting the charging device to an electronic device to be charged manually by a user. If the electronic device has a small size, a user may charge it easily.

However, if the charging device and the charging line both have a large size, it will be difficult to manually connect the charging line to the power supply device. In addition, when the charging device is not used, the charging device and the charging line are generally randomly placed beside the display device, which affects the overall aesthetic appearance of the display device.

Therefore, how to conveniently charge the electronic device and improve the aesthetic appearance of the charging device has become an urgent technical problem to be solved in the field.

As one aspect of the present disclosure, as shown in FIGS. 1, 2, 5, 8, and 9, there is provided a charging assembly 100 for charging an electronic device 200. The charging assembly 100 includes a charging transmission line. The charging transmission line includes a lead wire part 112, an output part 400 configured to be coupled to the electronic device 200 to be charged, and an input part 111 configured to be coupled to a power supply device. The input part 111 and the output part 400 are coupled to two ends of the lead wire part 112, respectively.

The charging assembly 100 further includes a fixing member 120 and a telescopic member 130. A first end of the telescopic member 130 is fixedly arranged on the fixing member 120, the output part 400 is fixed at the first end of the telescopic member 130, a second end of the telescopic member 130 is fixed at the input part 111, and the lead wire part 112 is deformable with extension and retraction of the telescopic member 130. The structure of the output part 400 is not particularly limited here, as long as the output part 400 is configured to electrically connect the lead wire part 112 and the electronic device 200. Optionally, the output part 400 may be a dedicated connector that is matched with the electronic device 200.

Figure 3:
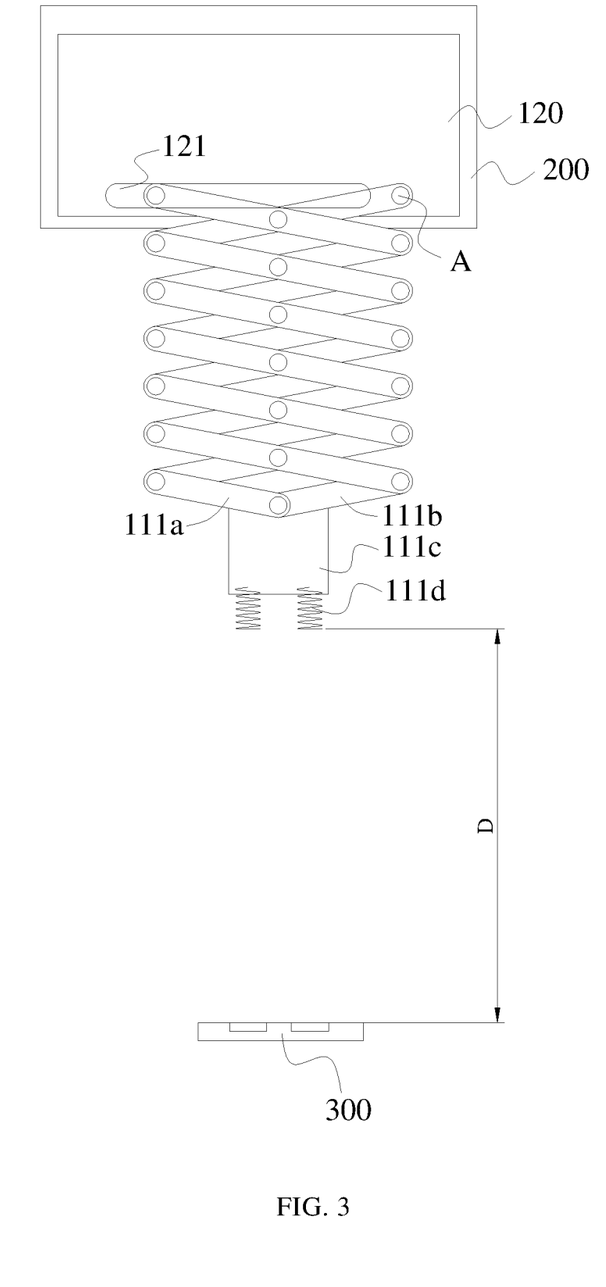
FIG. 3 is a schematic structural diagram of the first embodiment of the charging assembly according to the present disclosure, wherein the telescopic member is in a retracted state.
Figure 4:
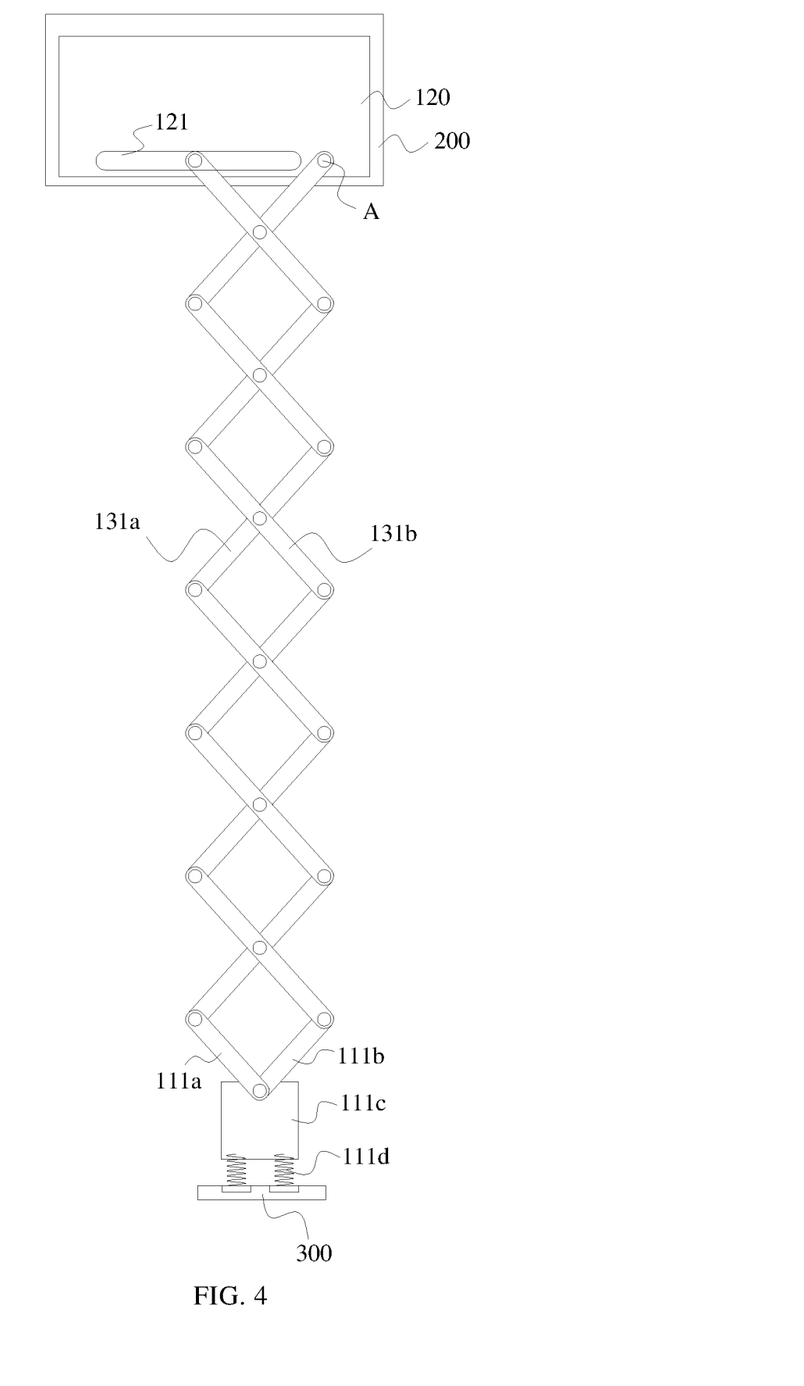
FIG. 4 is a schematic diagram showing the telescopic member of the charging assembly according to the first embodiment of the disclosure in an extended state and matched with the power supply device.
Figure 6:
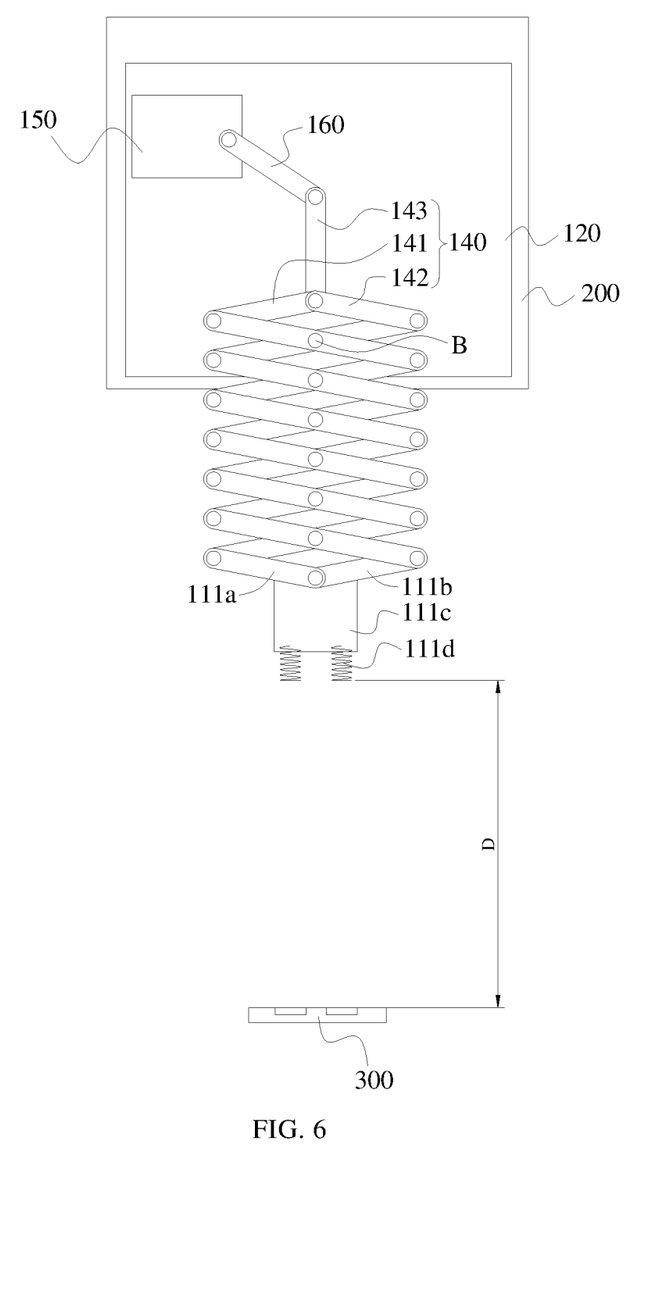
FIG. 6 is a schematic diagram showing the telescopic member of the charging assembly of FIG. 5 in a retracted state.

The charging assembly 100 of the present disclosure has two states, one is that the telescopic member 130 is in a retracted state, in which a distance D (for example, as shown in FIGS. 3 and 6) is present between the input part 111 and the power supply device so that the electronic device 200 cannot be charged by the charging assembly 100; and the other is that the telescopic member 130 is in an extended state (as shown in FIG. 4), in which the input part 111 is in contact with the power supply device, and the electronic device 200 is charged by the charging assembly 100.

Figure 7:
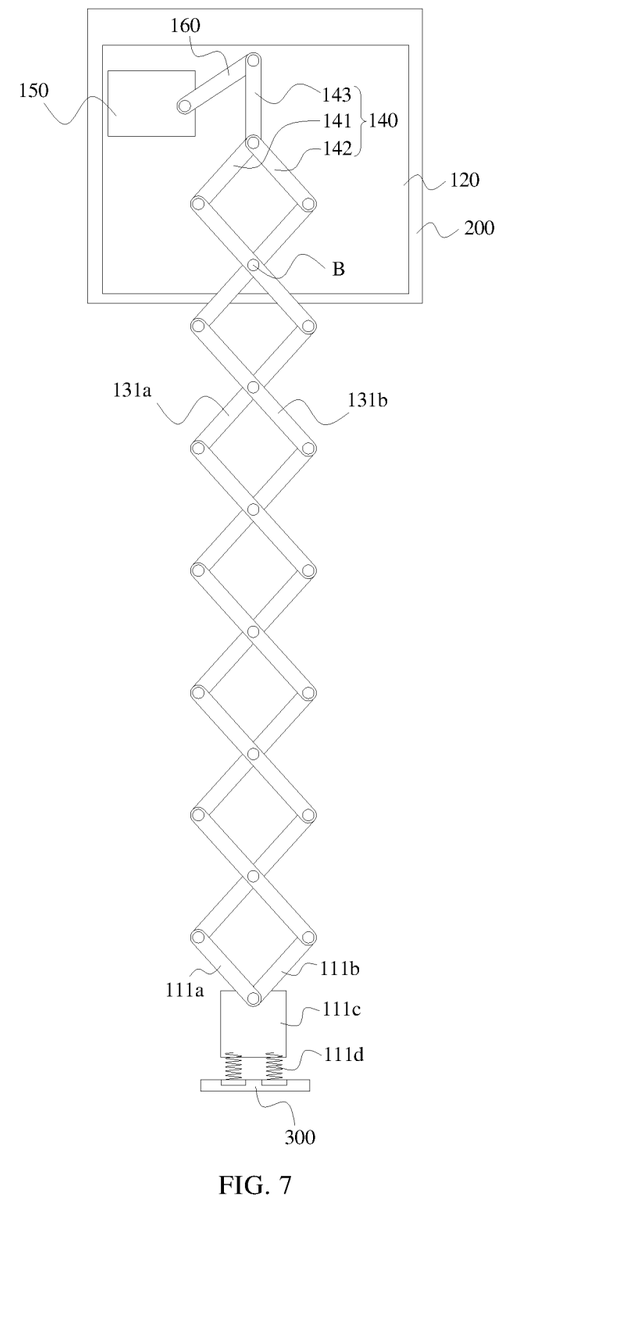
FIG. 7 is a schematic diagram showing the telescopic member of the charging assembly according to the second embodiment of the disclosure in an extended state and matched with the power supply device.

When the electronic device needs to be charged, the telescopic member 130 is driven to extend, so as to drive the input part 111 to move to a state of contacting the power supply device 300 as shown in FIGS. 4 and 7, and make the electronic device coupled to the power supply device via the charging transmission line.

When the charging is finished, the telescopic member 130 is driven to retract, so as to drive the input part 111 to retract to a state of separating from the power supply device by a distance D as shown in FIGS. 3 and 6, thereby disconnecting the charging transmission line from the power supply device 300.

When the charging assembly 100 is used for charging an electronic device, the input part 111 of the charging transmission line can be conveniently matched with the power supply device 300 simply by controlling the extension and retraction of the telescopic member 130 to realize the electrical connection between the input part 111 of the charging transmission line and the power supply device 300. Since it does not need to match the input part 111 of the charging transmission line with the power supply device 300 manually, the efficiency is improved while the labor cost is reduced. In addition, since the telescopic member 130 of the charging assembly 100 is retracted toward the fixing member 120 in a non-use state, an exposed area of the charging assembly 100 in the sight of a user is reduced. Therefore, the influence of the charging assembly 100 on the appearance of the electronic device in a non-use state is avoided, the whole device has a more attractive appearance, and the use experience of the user is improved.

In this embodiment, how to drive the extension and retraction of the telescopic member 130 is not particularly limited, and the extension and retraction of the telescopic member 130 may be controlled by a corresponding driving method according to the specific structure of the telescopic member 130.

For example, when the telescopic member 130 is a telescopic cylinder, the extension and retraction of the telescopic member 130 may be driven by introducing and extracting gas to/from the cylinder; and when the telescopic member 130 is a structure with a lead-screw threaded hole, the extension and retraction of the telescopic member 130 may be driven by rotation of the lead screw.

Figure 2:
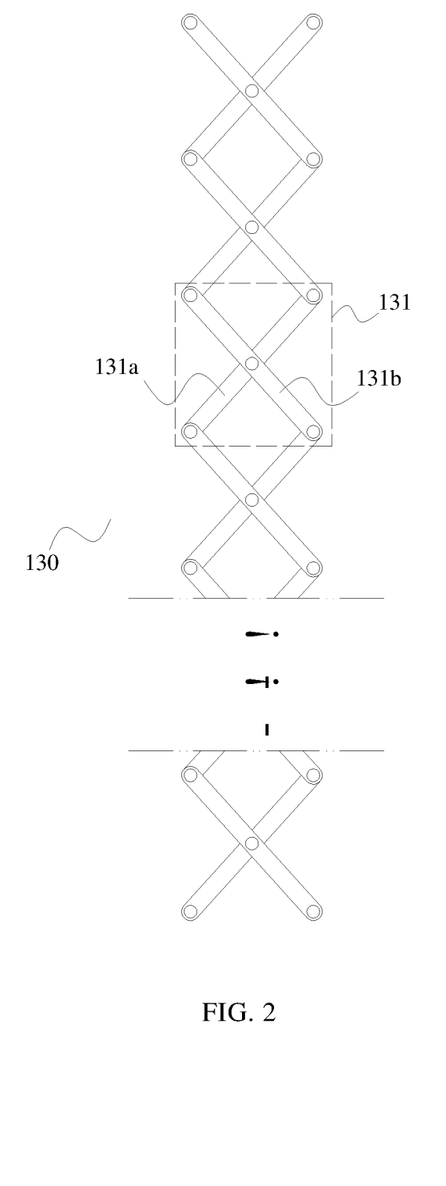
FIG. 2 is a schematic structural diagram of the telescopic member of the charging assembly shown in FIG. 1.

In order to simplify the overall structure of the charging assembly, as shown in FIG. 2, the telescopic member 130 includes a plurality of movable units 131 connected in sequence, each of which includes a first movable rod 131a and a second movable rod 131b intersected with each other and hinged at an intersection point. Each of the first movable rod 131a and the second movable rod 131b has a linear shape, and each of the movable units 131 has a substantially X shape. A hinge point between the first movable rod 131a and the second movable rod 131b is provided at a position substantially midway in a length direction of the first and second movable rods.

Specifically, in two adjacent movable units 131, a first end of the first movable rod 131a of one movable unit is hinged to a second end of the second movable rod 131b of the other movable unit, and a first end of the second movable rod 131b of one movable unit is hinged to a second end of the first movable rod 131a of the other movable unit so that when the second end of the first movable rod 131a of one of the plurality of movable units 131 is moved toward or away from the second end of the second movable rod 131b of the movable unit 131, the second ends of the first movable rods 131a of the rest movable units 131 are synchronously movable toward or away from the second ends of the second movable rods 131b of the movable units 131, and so that the telescopic member 130 is correspondingly extended or retracted.

Because of the telescopic member 130 with the above structure, all the movable units 131 can be controlled to perform the same action by controlling to change only one movable unit 131. Therefore, the control of the overall telescopic member 130 can be realized by merely operating one end (for example, the first end) of the telescopic member 130. The overall structure of the charging assembly 100 is simplified since no additional auxiliary device matched with the telescopic member 130 is required.

It should be understood here that "one movable unit 131" may be a movable unit 131 closer to the first end of the telescopic member 130, and correspondingly, "the other movable unit 131" may be a movable unit 131 closer to the second end of the telescopic member 130.

Figure 1:
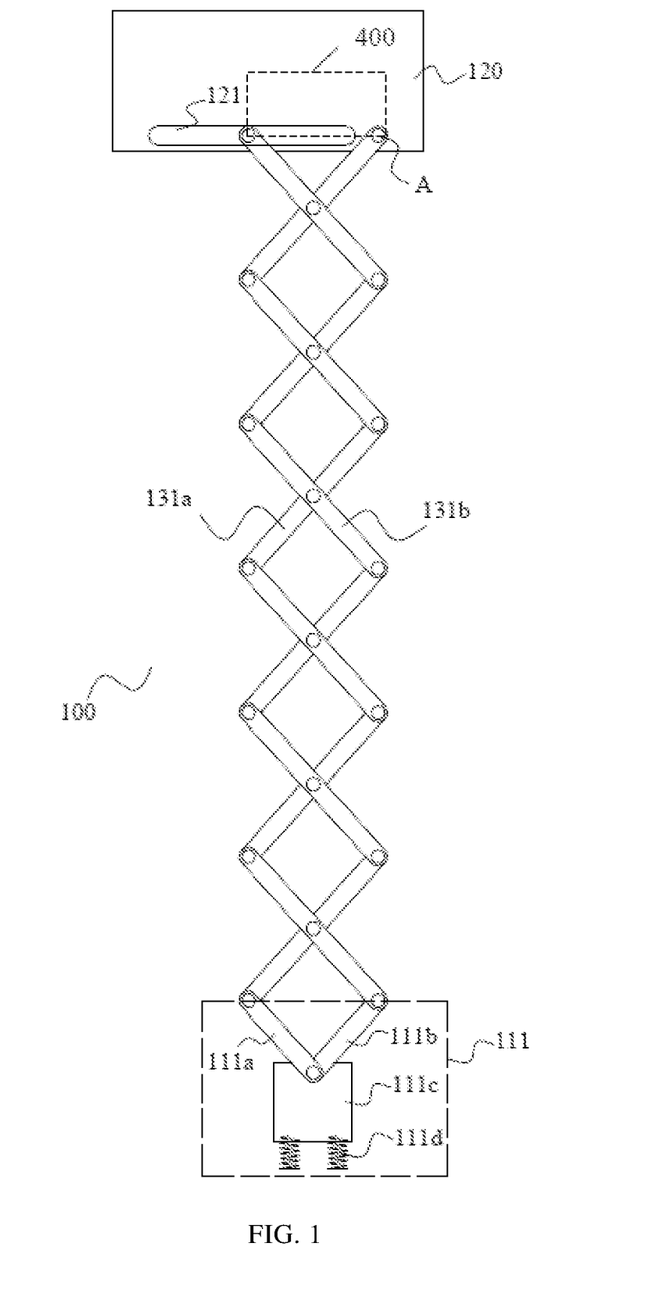
FIG. 1 is a schematic structural diagram of a first embodiment of a charging assembly according to the present disclosure, wherein the telescopic member is in an extended state.

As a first embodiment of the present disclosure, as shown in FIGS. 1, 3 and 4, a sliding groove 121 is provided on a surface of the fixing member 120. The second end of the first movable rod 131a of the movable unit 131 located at the first end of the telescopic member 130 is hinged to the fixing member 120 (at point A in the figures). The second end of the second movable rod 131b of the movable unit 131 located at the first end of the telescopic member 130 is disposed and slidable in the sliding groove 121, so as to move toward or away from the second end of the first movable rod 131a.

In the first embodiment of the present disclosure, the second end of the second movable rod 131b of the same movable unit 131 is controlled to be moved smoothly toward or away from the second end (point A) of the first movable rod 131a through the sliding groove 121, thereby improving smoothness and accuracy of the movement of the telescopic member 130, and thus increasing the docking accuracy of the input part 111 and the power supply device.

Figure 5:
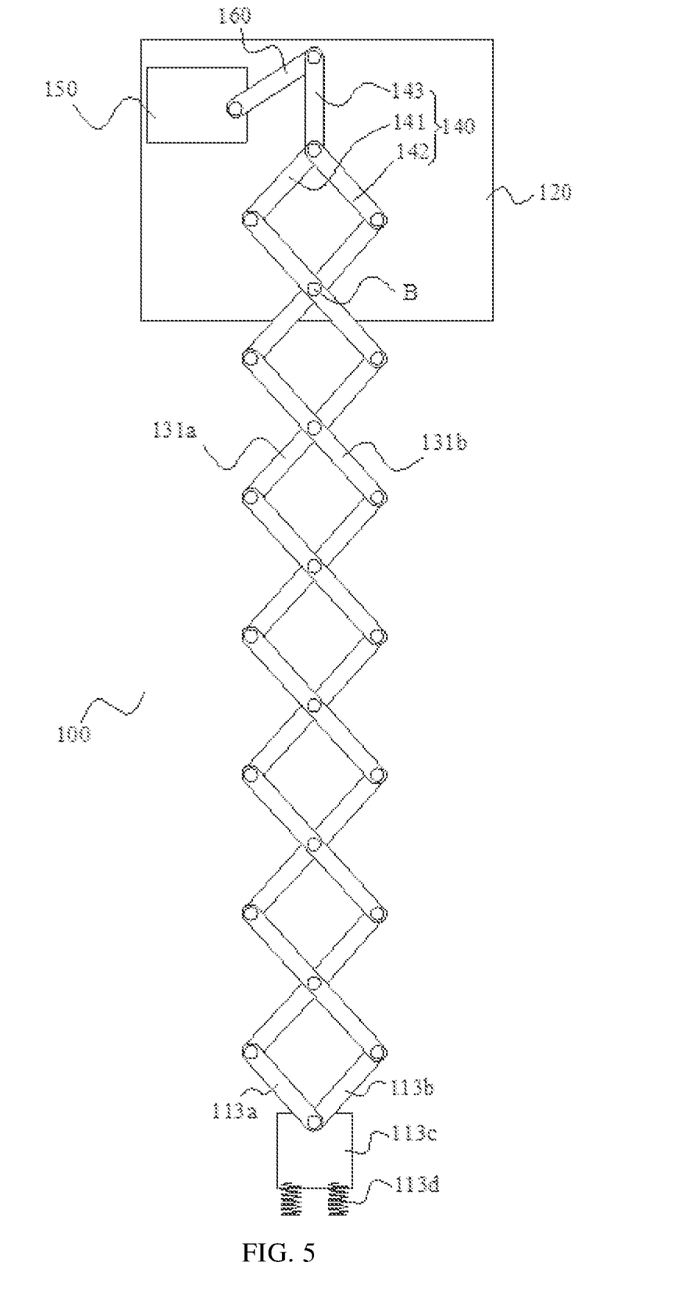
FIG. 5 is a schematic structural diagram of a second embodiment of the charging assembly according to the present disclosure, wherein the telescopic member is in an extended state.

As a second embodiment of the present disclosure, as shown in FIGS. 5 to 7, the charging assembly 100 may include a connection unit 140. The movable unit 131 located at the first end of the telescopic member 130 is hinged to the fixing member 120 at a hinge point (point B in the figures) of the first movable rod 131a and the second movable rod 131b of the movable unit. The connection unit 140 is hinged to the movable unit 131 located at the first end of the telescopic member 130.

In the second embodiment of the present disclosure, the extension or retraction of the telescopic member 130 may be implemented by lifting up or pushing down the second end of the first movable rod 131a and the second end of the second movable rod 131b of a first stage of movable units 131.

To facilitate driving of the telescopic member 130 by a driving mechanism, as shown in FIG. 5, the connection unit 140 includes a first connection rod 141, a second connection rod 142 and a third connection rod 143. First ends of the first connection rod 141, the second connection rod 142 and the third connection rod 143 are all hinged together; a second end of the first connection rod 141 is hinged to the second end of the second movable rod 131b of the movable unit 131 located at the first end of the telescopic member 130; and a second end of the second connection rod 142 is hinged to the second end of the first movable rod 131a of the movable unit 131 located at the first end of the telescopic member 130.

By means of the connection unit 140, the present disclosure can simultaneously lift up or push down the second end of the first movable rod 131a and the second end of the second movable rod 131b so that the first movable rod 131a and the second movable rod 131b of the telescopic member 130 are uniformly stressed to prevent the telescopic member 130 from swinging during extension or retraction.

The driving mechanism for the telescopic member 130 is not particularly limited in the present disclosure. For example, as shown in FIG. 5, the charging assembly 100 may further include a rotation rod 160 and a motor 150. A first end of the rotation rod 160 is fixedly connected to an output shaft of the motor 150, and a second end of the rotation rod 160 is hinged to a second end of the third connection rod 143.

By means of the motor 150 and the rotation rod 160, the present disclosure converts the rotational movement of the motor into linear movement of the connection unit 140, and thus provides a feasible transmission method for the movement of the telescopic member 130.

To improve the accuracy in angular control of the rotation rod 160, the motor 150 may be a steering engine that can accurately control a rotation angle of an output shaft thereof and have multiple advantages such as reliable transmission, easy maintenance, and simple structure. By selecting a steering engine as the motor 150 in the present disclosure, the extension and retraction of the telescopic member 130 can be controlled more simply and high-efficiently, and the extended and retracted length of the telescopic member 130 can be controlled more accurately, thereby further increasing the docking accuracy of the input part 111 and the power supply device.

Figure 8:
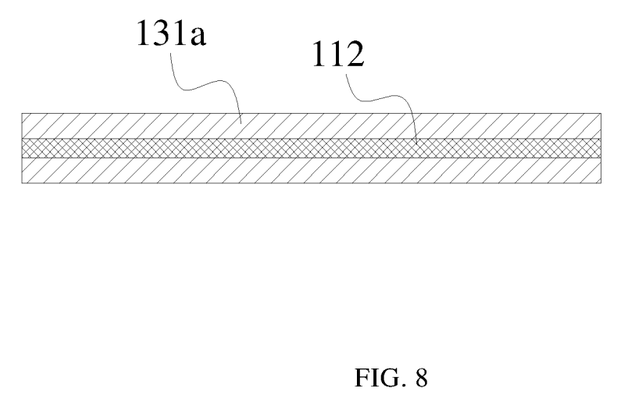
FIG. 8 is a schematic diagram showing a position relationship between a first movable rod and a charging transmission line in the charging assembly of the present disclosure.
Figure 9:
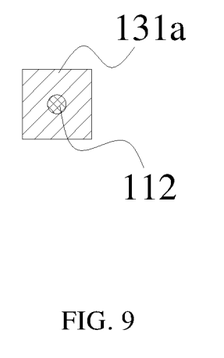
FIG. 9 is a sectional view of the first movable rod shown in FIG. 8.

In order to simplify the structure of the charging assembly 100 while preventing the lead wire part 112 from being wound around the telescopic member 130 during extension and retraction of the telescopic member 130, each of the movable units 131 has a lead wire through hole provided in the first movable rod 131a or the second movable rod 131b of a single movable unit 131, an axial direction of the lead wire through hole is consistent with a length direction of the first movable rod 131a when the lead wire through hole is provided in the first movable rod 131a, and an axial direction of the lead wire through hole is consistent with a length direction of the second movable rod 131b when the lead wire through hole is provided in the second movable rod 131b; and the lead wire part 112 of the charging transmission line sequentially passes through the lead wire through holes in the movable units 131.

In order to reduce the weight of the telescopic member 130 and enhance the transmission efficiency of the telescopic member 130, the first movable rod 131a and the second movable rod 131b may be made of an insulating plastic material.

The structure of the input part 111 is not particularly limited in the present disclosure. For example, as shown in FIG. 1, the input part 111 may include a first input connection rod 111a, a second input connection rod 111b, an input fixing member 111c and a plurality of elastic conductive members 111d. A first end of the first input connection rod 111a is hinged to the first end of the first movable rod 131a of the movable unit 131 located at the second end of the telescopic member 130, a second end of the first input connection rod 111a is hinged to the input fixing member 111c, a second end of the second input connection rod 111b is hinged to the first end of the second movable rod 131b of the movable unit 131 located at the second end of the telescopic member 130, a second end of the second input connection rod 111b is hinged to the input fixing member, and, a second end of the first input connection rod 111a is hinged to the second end of the second input connection rod 111b. The elastic conductive members 111d are arranged on the input fixing member 111c and coupled to the lead wire part 112, and are further configured to match the power supply device.

The specific structure of the elastic conductive members 111d is not particularly limited in the present disclosure. For example, the elastic conductive members 111d may be conductive springs or conductive elastic sheets.

As still another aspect of the present disclosure, there is provided an electronic device system, including an electronic device 200 and a charging assembly being the charging assembly 100 as provided in the present disclosure. The fixing member 120 is fixedly connected to the electronic device 200, and a charging end of the electronic device 200 is coupled to the output part of the charging transmission line.

When the electronic device 200 needs to be charged, the telescopic member 130 is driven to extend, so as to drive the input part 111 to move to a state of contacting the power supply device 300 as shown in FIGS. 4 and 7, and make the electronic device 200 coupled to the power supply device via the charging transmission line.

When the charging is finished, the telescopic member 130 is driven to retract, so as to drive the input part 111 to retract to a state of separating from the power supply device by a distance D as shown in FIGS. 3 and 6, thereby disconnecting the electronic device 200 from the power supply device 300.

The type of the electronic device 200 is not particularly limited in the present application. For example, the electronic device 200 may be an electronic picture frame.

Figure 10:
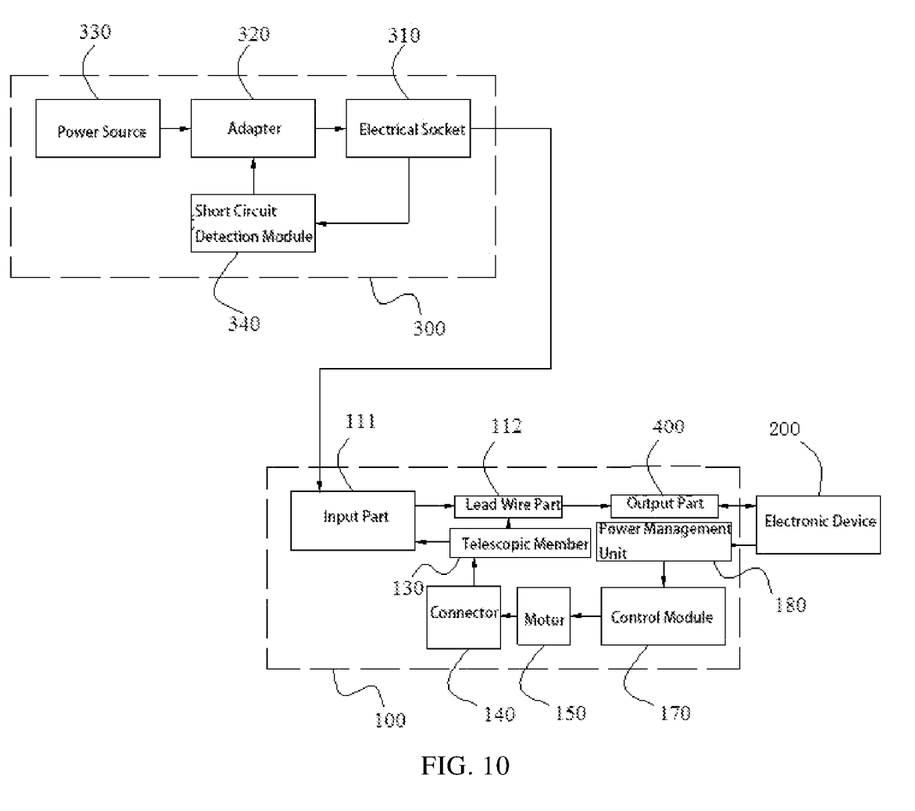
FIG. 10 is a functional block diagram of a solution for the charging assembly of the present disclosure implementing a charging function.

The electronic device 200 may be charged by the charging assembly 100 using the power supply device 300. As shown in FIG. 10, the power supply device 300 may include an electrical socket 310 and an adapter 320. An input end of the electrical socket 310 is connected to a power source 330 via the adapter 320, and the electrical socket 310 is provided with an electrical contact for contacting the input part 111 of the charging transmission line. The power source 330 may be 220V AC.

When the electronic device 200 needs to be charged, the telescopic member 130 in the charging assembly 100 of the present disclosure is controlled to extend so that the input part 111 of the charging transmission line is in contact with the output end of the electrical socket 310 to charge the electronic device 200; and when the electronic device 200 does not need to be charged, the telescopic member 130 is controlled to be retracted to withdraw the input part 111 of the charging transmission line.

The power supply device 300 may further include a short circuit detection module 340 for disconnecting the electrical socket 310 from an external power source when a short circuit fault is detected.

The method for controlling extension and retraction of the telescopic member 130 is not particularly limited in the present disclosure. For example, the extension and retraction of the telescopic member 130 may be automatically controlled by an electronic device system. As shown in FIG. 10, the charging assembly 100 further includes a control module 170 and a power management unit 180. The power management unit 180 is coupled to the electronic device 200, and configured to judge whether the electronic device 200 needs to be charged and send a charging or stop charging signal to the control module 170. The control module 170 is configured to, upon receiving a charging signal sent from the power management unit 180, control an actuator, such as a motor 150, to drive the telescopic member 130 to extend; and upon receiving a stop charging signal sent from the power management unit 180, control a driving mechanism to drive the telescopic member 130 to retract.

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A charging assembly for charging an electronic device, wherein the charging assembly comprises:
    a charging transmission line comprising a lead wire part, an output part configured to be coupled to the electronic device to be charged, and an input part configured to be coupled to a power supply device, the input part and the output part being coupled to two ends of the lead wire part, respectively;
    a fixing member; and
    a telescopic member, wherein a first end of the telescopic member is fixedly arranged on the fixing member, the output part is fixed at the first end of the telescopic member, a second end of the telescopic member is fixed at the input part, and the lead wire part is deformable with extension and retraction of the telescopic member,
    wherein the telescopic member comprises a plurality of movable units connected in sequence, each of which comprises a first movable rod and a second movable rod intersected with each other and hinged at an intersection point;
    in two adjacent movable units, a first end of the first movable rod of one movable unit is hinged to a second end of the second movable rod of the other movable unit, and a first end of the second movable rod of one movable unit is hinged to a second end of the first movable rod of another movable unit so that when the second end of the first movable rod of one of the plurality of movable units is moved toward or away from the second end of the second movable rod of the movable unit, the second ends of the first movable rods of the rest movable units are synchronously movable toward or away from the second ends of the second movable rods of the rest movable units, and so that the telescopic member is correspondingly extended or retracted, each of the movable units has a lead wire through hole provided in the first movable rod or the second movable rod of a single movable unit, an axial direction of the lead wire through hole is consistent with a length direction of the first movable rod when the lead wire through hole is provided in the first movable rod, and an axial direction of the lead wire through hole is consistent with a length direction of the second movable rod when the lead wire through hole is provided in the second movable rod; and the lead wire part of the charging transmission line sequentially passes through the lead wire through holes in the movable units.

2. The charging assembly according to claim 1, wherein a sliding groove is provided on a surface of the fixing member, the second end of the first movable rod of the movable unit located at the first end of the telescopic member is hinged to the fixing member, and the second end of the second movable rod of the movable unit located at the first end of the telescopic member is disposed and slidable in the sliding groove, so as to move toward or away from the second end of the first movable rod.

3. The charging assembly according to claim 1, wherein the charging assembly further comprises a connection unit, and the movable unit located at the first end of the telescopic member is hinged to the fixing member at a hinge point of the first movable rod and the second movable rod of the movable unit; and the connection unit is hinged to the movable unit located at the first end of the telescopic member.

4. The charging assembly according to claim 3, wherein the connection unit comprises a first connection rod, a second connection rod and a third connection rod, a first end of the first connection rod, a first end of the second connection rod and a first end of the third connection rod are all hinged together, a second end of the first connection rod is hinged to the second end of the second movable rod of the movable unit located at the first end of the telescopic member, and a second end of the second connection rod is hinged to the second end of the first movable rod of the movable unit located at the first end of the telescopic member.

5. The charging assembly according to claim 4, wherein the charging assembly further comprises a rotation rod and a motor, a first end of the rotation rod is fixedly connected to an output shaft of the motor, and a second end of the rotation rod is hinged to a second end of the third connection rod.

6. The charging assembly according to claim 1, wherein the input part comprises a first input connection rod, a second input connection rod, an input fixing member and a plurality of elastic conductive members, a first end of the first input connection rod is hinged to the first end of the first movable rod of the movable unit located at the second end of the telescopic member, a second end of the first input connection rod is hinged to the input fixing member, a first end of the second input connection rod is hinged to the first end of the second movable rod of the movable unit located at the second end of the telescopic member, a second end of the second input connection rod is hinged to the input fixing member, and, a second end of the first input connection rod is hinged to the second end of the second input connection rod; and the plurality of elastic conductive members are arranged on the input fixing member and coupled to the lead wire part, and are further configured to match the power supply device.

7. An electronic device system, comprising: an electronic device and a charging assembly, wherein the charging assembly is the charging assembly according to claim 1, the fixing member is fixedly connected to the electronic device, and a charging end of the electronic device is coupled to the output part of the charging transmission line.

8. The electronic device system according to claim 7, wherein the electronic device comprises an electronic picture frame.

* * * * *

UNITED STATES PATENT AND TRADEMARK OFFICE
CERTIFICATE OF CORRECTION

| | |
|---|---|
| PATENT NO. | : 11,664,668 B2 |
| APPLICATION NO. | : 16/770447 |
| DATED | : May 30, 2023 |
| INVENTOR(S) | : Xinyi Cheng |

It is certified that error appears in the above-identified patent and that said Letters Patent is hereby corrected as shown below:

On the Title Page

Under Item (71) Applicant, please remove "BOE TECHNOLOGY GROUP CO., LTD" and replace with "BOE TECHNOLOGY GROUP CO., LTD.".

Signed and Sealed this
Twenty-third Day of January, 2024

Katherine Kelly Vidal
*Director of the United States Patent and Trademark Office*